United States Patent
Ngo et al.

(10) Patent No.: US 9,323,628 B2
(45) Date of Patent: Apr. 26, 2016

(54) INSTANCE LEVEL SERVER APPLICATION MONITORING, LOAD BALANCING, AND RESOURCE ALLOCATION

(71) Applicant: DH2I Company, Fort Collins, CO (US)

(72) Inventors: Thanh Quy Ngo, Oregon City, OR (US); Samuel Revitch, Portland, OR (US)

(73) Assignee: DH2I Company, Fort Collins, CO (US)

( * ) Notice: Subject to any disclaimer, the term of this patent is extended or adjusted under 35 U.S.C. 154(b) by 128 days.

(21) Appl. No.: 14/048,241

(22) Filed: Oct. 8, 2013

(65) Prior Publication Data

US 2014/0149784 A1 May 29, 2014

Related U.S. Application Data (60) Provisional application No. 61/711,703, filed on Oct. 9, 2012.

(51) Int. Cl.
*G06F 11/20* (2006.01)
*H04L 29/08* (2006.01)
*H04L 12/24* (2006.01)

(52) U.S. Cl.
CPC ........ *G06F 11/2002* (2013.01); *H04L 41/0836* (2013.01); *H04L 41/5025* (2013.01); *H04L 67/1008* (2013.01); *H04L 41/0668* (2013.01)

(58) Field of Classification Search
CPC .......... G06F 2009/4557; G06F 9/4856; G06F 9/45533; G06F 3/0647; G06F 11/1484; G06F 11/203; G06F 2212/152; G06F 11/0712; G06F 11/301; G06F 11/2002; G06F 9/45545; G06F 13/14; H04L 67/1002; H04L 29/01
See application file for complete search history.

(56) References Cited

U.S. PATENT DOCUMENTS

| | | | | |
|---|---|---|---|---|
| 7,451,347 B2* | 11/2008 | Subbaraman et al. | .......... | 714/10 |
| 7,805,529 B2* | 9/2010 | Galluzzo et al. | .............. | 709/229 |
| 8,055,933 B2* | 11/2011 | Jaehde et al. | .................. | 714/4.1 |
| 8,260,840 B1* | 9/2012 | Sirota et al. | .................... | 709/201 |
| 8,473,566 B1* | 6/2013 | Cardente et al. | ............. | 709/216 |
| 8,938,639 B1* | 1/2015 | Tripathy et al. | ............... | 714/4.11 |
| 2003/0046396 A1* | 3/2003 | Richter et al. | ................ | 709/226 |
| 2004/0257985 A1 | 12/2004 | Sahai et al. | | |
| 2005/0081097 A1* | 4/2005 | Bacher et al. | ................... | 714/13 |
| 2005/0138517 A1* | 6/2005 | Monitzer | ....................... | 714/746 |
| 2006/0224764 A1* | 10/2006 | Shinohara et al. | ............. | 709/232 |
| 2008/0228459 A1* | 9/2008 | Jiang et al. | ....................... | 703/13 |

(Continued)

OTHER PUBLICATIONS

IconAircraft, Inc.: "About Spins and Spin Resistance", http://www.iconaircraft.com/news/about-spins-andspin-resistance.html, Apr. 8, 2014

(Continued)

*Primary Examiner* — Loan L. T. Truong
(74) *Attorney, Agent, or Firm* — Martensen IP (57) ABSTRACT

A system and methodology to monitor system resources for a cluster computer environment and/or an application instance allows user to defined failover policies that take appropriate corrective actions when a predefined threshold is met. An engine comprising failover policies and mechanisms to define resource monitoring, consumption, allocation, and one or more thresholds for a computer server environment to identify capable servers and thereafter automatically transition an application between multiple servers so as to ensure the application is continually operating within the defined metrics.

20 Claims, 5 Drawing Sheets

(56) References Cited

U.S. PATENT DOCUMENTS

| | | | |
|---|---|---|---|
| 2008/0243993 A1 | 10/2008 | Wang et al. | |
| 2009/0055507 A1* | 2/2009 | Oeda | G06F 9/4856 709/216 |
| 2009/0276771 A1* | 11/2009 | Nickolov | G06F 9/4856 717/177 |
| 2010/0002692 A1* | 1/2010 | Bims | H04L 1/0009 370/389 |
| 2010/0103837 A1* | 4/2010 | Jungck | H04L 29/12066 370/252 |
| 2010/0125477 A1* | 5/2010 | Mousseau et al. | 705/7 |
| 2010/0162036 A1* | 6/2010 | Linden et al. | 714/4 |
| 2010/0208662 A1* | 8/2010 | Fuste Vilella | H04W 40/00 370/328 |
| 2010/0217866 A1* | 8/2010 | Nandagopal et al. | 709/226 |
| 2011/0246992 A1* | 10/2011 | Kern | 718/100 |
| 2012/0254862 A1* | 10/2012 | Dong | G06F 9/4856 718/1 |
| 2012/0266026 A1* | 10/2012 | Chikkalingaiah | G06F 11/0751 714/38.1 |
| 2012/0278571 A1* | 11/2012 | Fleming | G06F 9/455 711/162 |
| 2012/0324445 A1* | 12/2012 | Dow | G06F 9/45504 718/1 |
| 2012/0324446 A1* | 12/2012 | Fries | G06F 21/64 718/1 |
| 2013/0060946 A1* | 3/2013 | Kenneth | G06F 12/0866 709/226 |
| 2013/0111015 A1* | 5/2013 | Bauchot et al. | 709/224 |
| 2013/0185408 A1* | 7/2013 | Ngo | H04L 41/046 709/223 |
| 2013/0227127 A1* | 8/2013 | Takano | G06F 9/5044 709/224 |
| 2013/0227558 A1* | 8/2013 | Du | G06F 9/5077 718/1 |
| 2013/0227559 A1* | 8/2013 | Tsirkin | G06F 9/45558 718/1 |
| 2013/0325899 A1* | 12/2013 | Mohaban | G06Q 10/10 707/791 |
| 2013/0326173 A1* | 12/2013 | Tsirkin | G06F 9/45558 711/162 |
| 2014/0038549 A1* | 2/2014 | Lehane | H04W 24/02 455/406 |
| 2014/0082240 A1* | 3/2014 | Coleman | G06F 9/4812 710/260 |
| 2014/0173329 A1* | 6/2014 | Bennah | G06F 11/2028 714/4.11 |

OTHER PUBLICATIONS

Lin J C Ed—Platzer Max et al.,"Review of Research on Low-Profile Vortex Generators to Control Boundary-Layer Separation", Progress in Aerospace Sciences, Jan. 1, 2002, pp. 389-420, vol. 38,Oxford, Great Britain.

International Search Report and Written Opinion of the International Searching Authority; Feb. 5, 2014; PCT/US2013/063974.

* cited by examiner

INSTANCE LEVEL SERVER APPLICATION MONITORING, LOAD BALANCING, AND RESOURCE ALLOCATION

RELATED APPLICATION

The present application relates to and claims the benefit of priority to U.S. Provisional Patent Application No. 61/711,703 filed Oct. 9, 2012, which is hereby incorporated by reference in its entirety for all purposes as if fully set forth herein.

BACKGROUND OF THE INVENTION

1. Field of the Invention

Embodiments of the present invention relate, in general, to software virtualization and, more particularly, to virtualization and load balancing of server application instances in a cluster environment.

2. Relevant Background

Load balancing is a computer networking methodology to distribute an individual computer's workload across multiple computers or a computer cluster, network links, central processing units, disk drives, or other resources, to achieve optimal resource utilization, maximize throughput, minimize response time, and avoid overload. Load balancing is usually provided by dedicated software or hardware, such as a multilayer switch or a domain name system server. Examples of the software solutions include the Apache web server's mod_proxy_balancer extension, Varnish, or the Pound reverse proxy and load balancer.

An important issue when operating a load-balanced service is how to handle information that must be kept across the multiple requests in a user's session. If this information is stored locally on one backend server, then subsequent requests going to different backend servers would not be able to find it. This might be cached information that can be recomputed, in which case load-balancing a request to a different backend server introduces a performance issue, but if the information is lost, the system can crash.

One solution to the session data issue is to send all requests in a user session consistently to the same backend server. This is known as persistence or stickiness. A significant downside to this technique is its lack of automatic failover: if a backend server goes down, its per-session information becomes inaccessible, and any sessions depending on it are lost.

Recall that a server is a physical computer dedicated to run one or more services to serve the needs of the users of other computers on a network. Said differently, any computerized process that shares a resource to one or more client processes is, for all intents and purposes, a server. For example, the mechanism that shares files to clients by the operating systems is a file server. Thus, depending on the computing service that the server offers, the server could be a database server, a file server, a mail server, a print server, a web server, a game server or some other kind of server based on the services it provides. In the hardware sense, the word server typically designates computer models intended for hosting software applications under heavy demand in a network environment. And in some cases, the hardware for these specific functions is specialized. That is, a server computer possesses different capabilities than that of a general purposes personal computer.

Figure 1:
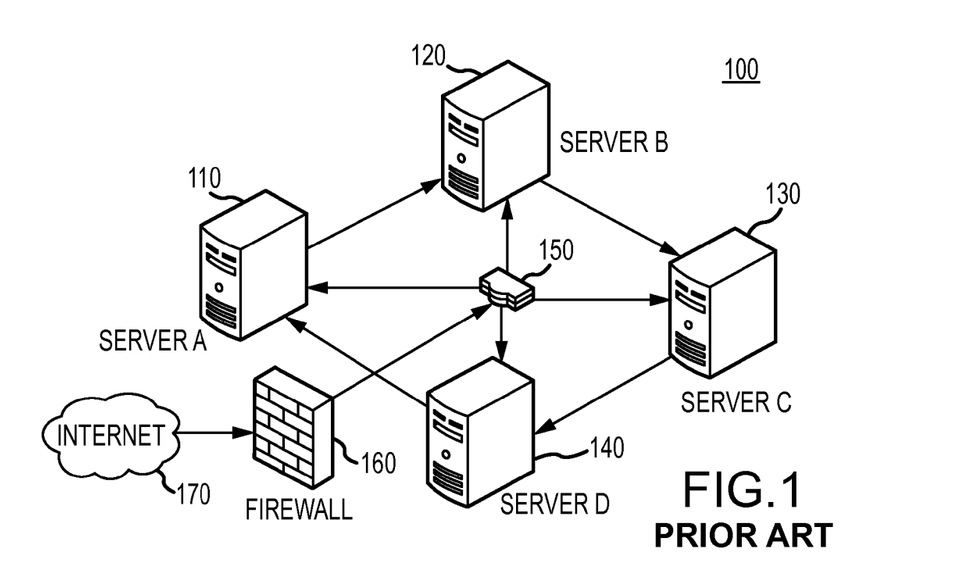
FIG. 1 is a high level block diagram of a server cluster environment as is known in the prior art.

A server cluster, as referred to herein, is a group of at least two independent servers connected by a network and managed as a single system to provide high availability of services for clients. FIG. 1 is a high level depiction of a server cluster environment as would be known to one of reasonable skill in the relevant art. In the illustrated depiction, four servers comprise a server cluster 100. In this case, server A 110, server B 120, server C 130, and server D 140 are linked both directly and via a load balancer/router 150. The router 150 further serves as access to the Internet 170 and the firewall 160.

Server clusters are designed so that the servers in the cluster work together to protect data, keep applications and services running after the failure of one or more servers in the cluster, and maintain consistency of the cluster configuration. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server. So, when a failure occurs on one computer in a cluster, resources are redirected and the workload redistributed to another computer in the cluster.

Figure 2:
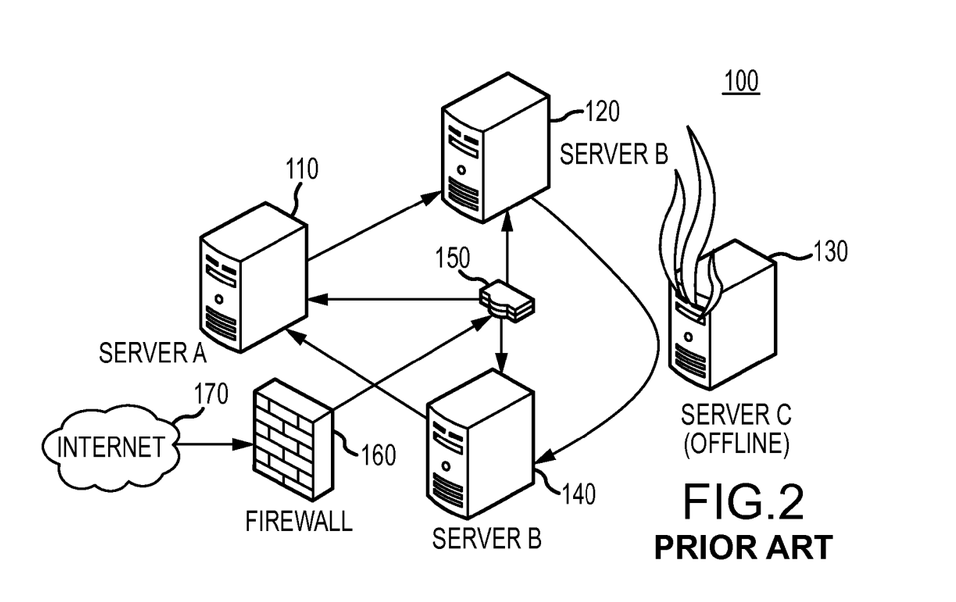
FIG. 2 is a high level block diagram of the server cluster environment of FIG. 1 depicting a server failure and system failover.

FIG. 2 is a further illustration of the server cluster shown in FIG. 1 in which server C 130 has failed. As would be known by one of reasonable skill in the relevant art, the removal of the server in a server cluster utilizes existing failover technology to terminate and restart the applications associated with server C 130 on another server within the server cluster. However, by doing so the applications associated with server C must be re-instantiated with a new host and new Internet protocol address.

Other benefits of server clusters include the ability for administrators to inspect the status of cluster resources, and accordingly balance workloads among different servers in the cluster to improve performance. Such manageability also provides administrators with the ability to update one server in a cluster without taking important data and applications offline. As can be appreciated, server clusters are used in critical database management, file and intranet data sharing, messaging, general business applications, and the like.

Server clusters come in all shapes and sizes but they are generally either asymmetric clusters or symmetric clusters. In an asymmetric cluster, a standby server exits only to take over for another server in the event of failure. This type of cluster provides high availability and reliability of services but does so at the cost of having redundant and unused capability. The standby server performs no useful work and is either as capable or less capable than the primary server. In a symmetric server cluster, every server in the cluster performs some useful work and each server in the cluster is the primary host for a particular set of applications. If a server fails, the remaining servers continued to process the assigned set of applications as well as pick up new applications from the failed server. Symmetric server clusters are more cost effective but, in the event of a failure, the additional load on the working servers can make them fail as well.

On each server exists one or more instantiations of various applications. Underlying these applications is a database engine such as Microsoft Transacted Structured Query Language or T-SQL. T-SQL (referred to herein as SQL) is a special purpose programming language designed for managing data in relational database management systems. Originally built on relational algebra and tuple relational calculus, its scope includes data insert, query, update and delete functionality, schema creation and modification, and data access control. Other relational alternatives to SQL include .QL, 4D Query Language, Datalog, URL based query method, IBM Business Systems 12, ISBL, JPQL, Object Query Language, UnQL, QBE and the like.

SQL is a popular database engine that servers use as a building block for many larger custom applications. Each application built using SQL Server (or the like) typically communicates with a single instance of the database engine using that servers name and Internet Protocol address. Thus, servers with many applications depending on SQL server to access a database must normally run an equal number of instances of SQL server. In most cases, each instance of SQL server runs on a single node within the server cluster, each with its own name and address. If the node (server) fails, the databases are unavailable until the system is restored on a new node with a new address and name. Moreover, if the node becomes heavily loaded by one or more applications, the performance of the database and other applications can be degraded.

Generally, there are three types of server cluster failures. The first is application or service failure. These failures occur when application software running on a server fails to perform properly. Second is a system or hardware failure. As implied, this type of failure is tied to the hardware components of one or more servers. For example, the failure of one or more CPUs, drives, memory or power supply. Lastly, a site failure can occur when, due to a natural event such as a storm or a power failure, an entire site fails to perform as expected. The ability to handle each of these types of failures is critical to server cluster's reliability.

Thus, the failover of an application from one server (i.e., machine) to another in the cluster may be automatic in response to a software or hardware failure on the first machine, or alternatively, may be manually initiated by an administrator. However, unless an application is "cluster-aware" (i.e., designed with the knowledge that it may be run in a clustering environment), problems arise during failover.

One problem with existing virtual applications that are not cluster-aware, i.e., legacy applications such as SQL server, is that such applications assume that the current machine name is the only computer name. Consequently, if the application exposes the machine name to clients, or writes the machine name into its persistent configuration information, the system will not function correctly when the application fails over and runs on a different machine having a different machine name. By way of example, an electronic mail application program provides its machine name to other machines connected thereto in a network. If the application is running in a cluster and the server is failed over to another machine, this other machine's name will not be the name that was provided to the other network machines, and the electronic mail application will not function correctly.

To address this deficiency, traditional virtualization platforms for applications in the prior art use failover clustering technology. For example, Microsoft Windows® uses Microsoft Failover Clustering ("MSCS")®. MSCS, and products like MSCS, allows one or more computers to join together to form a cluster. An application then can be made to listen and provide data to clients via a cluster host name or Internet Protocol ("IP") address and not individual computer names. If an active node (computer) fails, MSCS would reposition the application over to the next available node in the cluster to maintain functionality of the application. To avoid data corruption and to ensure only one node in the entire cluster can have access to the file system, New Technology File System ("NTFS"), Small Computer System Interface ("SCSI") reservation is employed. What is lacking, however, is the ability to virtualize an application, such as SQL server, in a cluster environment without utilizing MSCS and SCSI reservation.

One of reasonable skill in the relevant art will recognize that virtualization, broadly defined, is the simulation of the software and/or hardware upon which other software runs. This simulated environment is often called a virtual machine (VM). A virtual machine is thus a simulation of a machine (abstract or real) that is usually different from the target (real) machine (where it is being simulated on). Virtual machines may be based on specifications of a hypothetical computer or emulate the computer architecture and functions of a real world computer. There are many forms of virtualization, distinguished primarily by the computing architecture layer, and virtualized components, which may include hardware platforms, operating systems (OS), storage devices, network devices or other resources.

Application or process virtualization can be viewed as part of an overall trend in enterprise IT that includes autonomic computing. Autonomic computing is a scenario in which the IT environment is able to manage itself based on perceived activity, and utility computing, in which computer processing power is seen as a utility that clients can pay for only as needed. The usual goal of virtualization is to centralize administrative tasks while improving scalability and overall hardware-resource utilization. This type of parallelism tends to reduce overhead costs and differs from multitasking, which involves running several programs on the same OS (component).

Hardware virtualization or platform virtualization refers to the creation of a virtual machine that acts like a real computer with an operating system. Software executed on these virtual machines is separated from the underlying hardware resources. For example, a computer that is running Microsoft Windows may host a virtual machine that looks like a computer with the Ubuntu Linux operating system; Ubuntu-based software can be run on the virtual machine.

In hardware virtualization, the host machine is the actual machine on which the virtualization takes place, and the guest machine is the virtual machine. The words host and guest are used to distinguish the software that runs on the physical machine from the software that runs on the virtual machine. The software or firmware that creates a virtual machine on the host hardware is sometimes called a hypervisor.

A significant limitation to a server cluster environment is the inability to manage individual applications during a failover. One approach to address this deficiency in the prior art is to virtualize an application such as SQL server in a cluster environment without the required use of MSCS or the like and to establish a shared cluster system in which every node in a cluster possesses continuous full read and write access and thus eliminate the need for MSCS or SCSI reservations. Such an approach is described in commonly assigned U.S. patent application Ser. No. 13/743,007 filed 16 Jan. 2013 entitled "Systems and Methods for Server Cluster Application Virtualization."

In most server clusters, components are monitored continually (e.g., web servers may be monitored by fetching known pages), and when one becomes non-responsive, a load balancer is informed and no longer sends traffic to that particular server. And, conversely, when a component comes back on line, the load balancer begins to route traffic to it again. But for this approach to work, there must be at least one physical component in excess of the service's capacity.

Recall that failover is the continuation of a service after the failure of one or more components (servers or applications) in server cluster. Recall that a server cluster is a group of at least two independent servers connected by a network and managed as a single system. One important benefit of a server cluster is that cluster software run on each of the servers in a cluster and can detect application failures or the failure of another server in the cluster. Upon detection of such failures, failed applications and the like can be terminated and restarted on a surviving server according to a failover plan.

Traditionally, failover clustering solutions are used to monitor an application and failover the application from one system to another system when the prior system is nonfunctional or crashed. Both failover and load balancing are critical to the efficient and effective operation of a server in a server cluster. Currently however, the systems of the prior art provide either application failover OR load balancing but not both. And these systems are designed for individual components not for the entire cluster.

Many database administration product companies have applications that are tightly coupled to the server they reside on, whether physical or virtual. As a result, and because of the simplicity of a SQL Server installation, server sprawl ensues. Due to this tight coupling, applications are difficult to move or migrate as changes in workload (load balancing) occur. Moving applications between servers in on-premises or in cloud environments can be time-consuming and expensive and can result in the over-provisioning of both server and storage resources.

Server sprawl problems include
  Restrictive Deployment Model: One instance tightly coupled to one server deployment means instance movement between servers is labor-intensive, time-consuming and prone to manual errors.
  Business Implication: It becomes difficult, if not impossible, to respond to changes in workloads necessary to support the business—productivity, innovation, time-to-market and competitive advantage are threatened.
  Expensive High Availability: Requires specialized redundant hardware or clustering—redundant hardware sits idle until failure.
  Business Implication: Overall corporate budget drain, as well as lost opportunity to allocate resources to IT assets and/or head-count that could be dedicated to activities directly related to business core competencies and the company's bottom line.
  Disruptive Technology Refresh/Migrations: Typically, every 3-4 years server/storage hardware tech is refreshed—requiring a forklift upgrade or rip-and-replace. Each refresh requires scheduled application downtime. Afterwards, applications must be reinstalled. If storage is refreshed, data must also be migrated.
  Business Implication: Quite simply, most business organizations find it difficult to tolerate even a short interruption in service, let alone an extended disruption. Moreover, there are typically errors during the reinstallation of applications and/or data migrations, causing additional business disruptions.
  Overall Poor Economic Value: Microsoft SQL Server sprawl leads to high licensing costs, over-provisioned servers and storage, and labor-intensive administration/management.

As a result of server sprawl and inadequate load balancing, IT time and resource must be increasingly assigned to this application and server management resulting in a missed opportunity to assign funds and expertise to areas that would directly impact the bottom line. These and other deficiencies of the prior art are addressed by one or more embodiments of the present invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system and methodology to monitor system resources (i.e. processor, memory, disk I/O, and network throughput) for a cluster computer environment and/or an application, such as SQL Server, allows user to define policies that take appropriate corrective actions when a predefined threshold is met. One or more embodiments of the present invention provides an engine comprising policies and mechanisms to define resource monitoring, consumption, allocation, and one or more thresholds for a computer server environment (such as SQL Server) to automatically transition an application between multiple servers so as to ensure the application is continually operating within the defined metrics. In doing so, the present invention allows an application to be load balanced across multiple systems.

According to another embodiment of the present invention, a load balancer enables the server or database administrator to set thresholds for CPU usage, memory and IO usage, and network bandwidth; and define when an application instance will be moved based on conditions met or exceeded. By doing so, processing power of the servers are intelligently leveraged and server instances are automatically and seamlessly redirected to servers with the lightest workloads, and therefore capable of providing the fastest and optimal performance.

In addition, instance level management intelligence is provided, in one embodiment, to SQL Servers. Policies can be pre-set for each instance (e.g., memory, CPU, and I/O usage, or network bandwidth) allowing instances to move automatically to support business objectives. Instances can be load-balanced, quickly and transparently, to onsite or remote resources (i.e., cloud) for virtually unlimited flexibility and scalability. As a result, onsite resources can be fully optimized and capital expenditures deferred.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments, taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Disclosed hereafter by way of example are systems and associated methodologies that monitor an application (i.e. SQL Server instance or the like) on a particular server and enable a desired Service Level Agreement ("SLA") (or threshold for either processor, memory, disk IO, and/or networking) to be set. When the threshold is triggered, the present invention examines other servers in the cluster or defined environment to see whether there is a better place to move this particular application. And to determine the better location, the present invention utilizes a system that collects and monitors each server's system utilization and capabilities. Moreover the present invention checks to see whether there are other rules/policies/SLA's belonging to other applications to make sure the application moved to another server does not violate the destination server's utilization. In doing so, the client's workload/requests are not distributed across the cluster. Accordingly, the present invention provide a mechanism to allow a server's application to easily and freely move within the cluster to achieve the application SLA.

Embodiments of the present invention are hereafter described in detail with reference to the accompanying Figures. Although the invention has been described and illustrated with a certain degree of particularity, it is understood that the present disclosure has been made only by way of example and that those skilled in the art can resort to numerous changes in the combination and arrangement of parts without departing from the spirit and scope of the invention. The disclosure includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. By the term "substantially," it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

For the purpose of the present invention, the following terms are defined to add clarity and prevent any confusion or misconception.

Internet Protocol (IP) is the principal communications protocol used for relaying datagrams (also known as network packets) across a network using the set of communications protocols. It is generally the most popular protocol stack for wide area networks and is commonly known as TCP/IP, because of its most important protocols. IP is responsible for routing packets across network boundaries and is the primary protocol in the Internet Layer of the Internet Protocol Suite. For this purpose, IP defines datagram structures that encapsulate the data to be delivered. It also defines addressing methods that are used to label the datagram source and destination.

New Technology File System (NTFS) is the standard and proprietary file system developed by Microsoft for the Windows line of operating systems including, for example, Windows NT, Windows XP and Windows Server.

Small Computer System Interface (SCSI) is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners and CD drives, although not all controllers can handle all devices. The SCSI standard defines command sets for specific peripheral device types; the presence of "unknown" as one of these types means that in theory it can be used as an interface to almost any device, but the standard is highly pragmatic and addressed toward commercial requirements Microsoft Cluster Server Software (MSCS) is software designed to allow servers to work together as a computer cluster and to provide failover and increased availability of applications, or parallel calculating power in case of high-performance computing (HPC) clusters (as in supercomputing), that allows servers working together as a computer cluster.

In object-oriented programming, an instance (or instantiation) is an occurrence or a copy of an object, whether currently executing or not. Instances of a class share the same set of attributes, yet will typically differ in what those attributes contain. For example, a class "Employee" would describe the attributes common to all instances of the Employee class. For the purposes of the task being solved, Employee objects may be generally alike, but vary in such attributes as "name" and "salary." The description of the class would itemize such attributes and define the operations or actions relevant for the class, such as "increase salary" or "change telephone number." One could then talk about one instance of the Employee object with name="Jane Doe" and another instance of the Employee object with name="John Doe".

Also, in object-oriented programming, a class is a construct that is used as a blueprint to create instances of itself— referred to as class instances, class objects, instance objects or simply objects. A class defines constituent members which enable these class instances to have state and behavior. Data field members (member variables or instance variables) enable a class object to maintain state. Other kinds of members, especially methods, enable a class object's behavior. Class instances are of the type of the associated class.

Load balancing, in distributed processing, refers to the distribution of activity across two or more servers in order to avoid overloading any one with too many requests from users or applications. Load balancing can be either static or dynamic. In the former, the load is balanced ahead of time by assigning different groups of applications to different servers. In the latter, software refers incoming requests at runtime to whichever server is most capable of handling them.

The present invention automates instance-level load balancing. According to one embodiment of the present invention, application virtualization software enables enterprise applications to move freely and transparently within and between heterogeneous physical, virtual, and cloud environments with very little interruption in service. Moreover, instance load balancing automatically distributes instantiation of components (applications) across instance containers (virtual hosts) on multiple servers, according to run-time information such as the comparative load on each server without affecting the servers within the server cluster. For the purposes of the present invention, a virtual host is a logical instance container that operates on top of physical and virtual servers, and accordingly does not include an operating system. A virtual host is not a virtual machine. Each virtual host instantiates one or more virtual IP addresses that are distinct from the IP addresses of the virtual machine on which it operates. The present invention also enables systems/storage, application and database administrators to simplify and improve application management across physical, virtual and cloud computing environments, resulting in dramatically enhanced performance, productivity, resource utilization (server and storage) and quality of service, as well as significant cost savings.

For example, and according to one embodiment of the present invention, an organization that has a physical infrastructure and/or private cloud in place, with access to a public cloud, can set parameters stating that when the private cloud is not providing what the server instance requires, the private cloud instance can be moved to the public cloud in order to access virtually unlimited resources. If and when the instance has completed its mission, it can be moved back in-house as required.

While the present invention is generally described as being applied to a SQL server application, one of reasonable skill in the relevant art will appreciate that the present invention can be used to provide monitoring and load-balancing for other applications, such as Exchange, Oracle, SharePoint, and Informix.

Various embodiments of the present invention enables server instances, such as Microsoft SQL Server, to move freely and transparently within and between physical, virtual and cloud environments with very little interruption in service. In addition, separate engines monitor the performance of the servers and apply user set policies regarding capability settings. As a result, obligatory manual intervention is eliminated.

According to one aspect of the present invention, customers can set performance policies for each instance and/or server, utilizing metrics such as memory, CPU and I/O usage or network bandwidth. The present invention then automatically actively searches out suitable servers and moves instances to meet the pre-set performance thresholds. Moreover, unique response policies can be set allowing for alerts that range from a simple advisory with details regarding a change that has been made, to a change-request message requiring a response before any action is taken.

Figure 3:
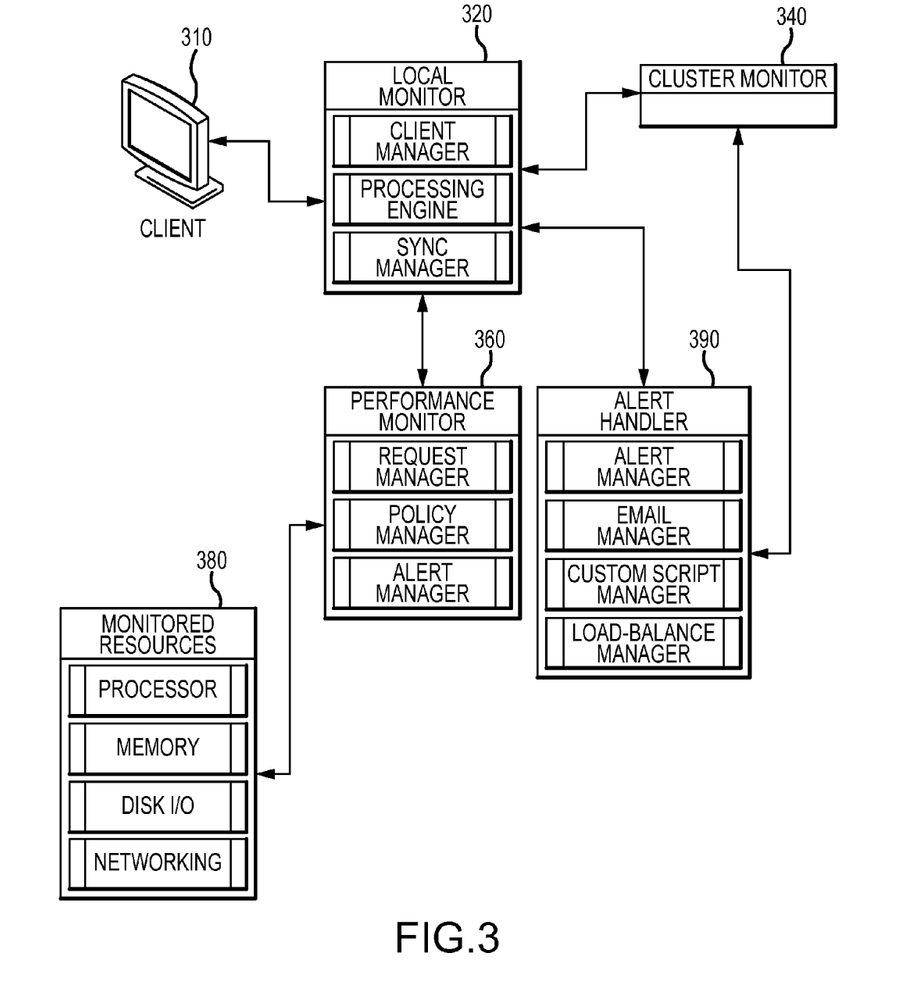
FIG. 3 shows a high level block diagram of a system for server application monitoring, load balancing, and resource allocation according to one embodiment of the present invention.

According to one embodiment of the present invention, and as shown in FIG. 3, the server cluster monitoring/balancing system is comprised of a Local Monitor 320, a Performance Monitor 360 and associated monitored resources 380, an Alert Handler 390 and a Cluster Monitor 340. The local Monitor 320 is, according to one embodiment, responsible for receiving and forwarding policies/requests from user interface to Alert Handler 390 and Performance Monitor 360 while the Performance Monitor 360 is responsible for receiving policies/requests, carry-out resource monitoring, and generating alerts. The Alert Handler 390 is responsible for carrying out user defined actions for the identified policies and the Cluster Monitor 340 is responsible for carrying out rebalancing requests for any application.

In one embodiment of the present invention, the Performance Monitor 360 includes a Request Manager that handles incoming requests, a Policy Manager for carrying out resource monitoring, and an Alert Manager that generates appropriate alerts and forwarding those alerts to the Local Monitor 320.

The Alert Handler 390 also includes an Alert Manager that maintains and manages active and expired alerts, an Email Manager that handles email notifications, a Custom Script Manager for user defined script execution and a Load-balance Manager that analyzes resource samplings so as to determine the best system to satisfy a user defined SLA. According to one embodiment, the Load-balance manager of the Alert Manager 390 can either move the monitored application to another system or move a lesser important application to another system to free up local resource.

An alternative embodiment to building a monitoring and failover solution is a design that includes a Cluster Manager that is comprised of a mechanism that keeps track of cluster members and keeps all members in sync. Such a system can include a Client Manager that acts as an interface to accept client requests and reply to such requests, an Engine Manager acting as a mechanism to carry out client requests, a Policy Manager that manages user defined policies, an Alert Manager to notify of a system event, and a Load-balance Manager for providing a mechanism to rebalance the system resource consumption to meet the required SLA.

A new resource performance engine/model, according to one embodiment of the present invention, keeps track of system resource utilizations, provides real-time monitoring, and interfaces with the servers to load balance an application across multiple systems. For any application that supports "Shared Everything" architecture, the invention can be extended to provide a cheaper and more efficient load-balanced platform for the applications.

Figure 4:
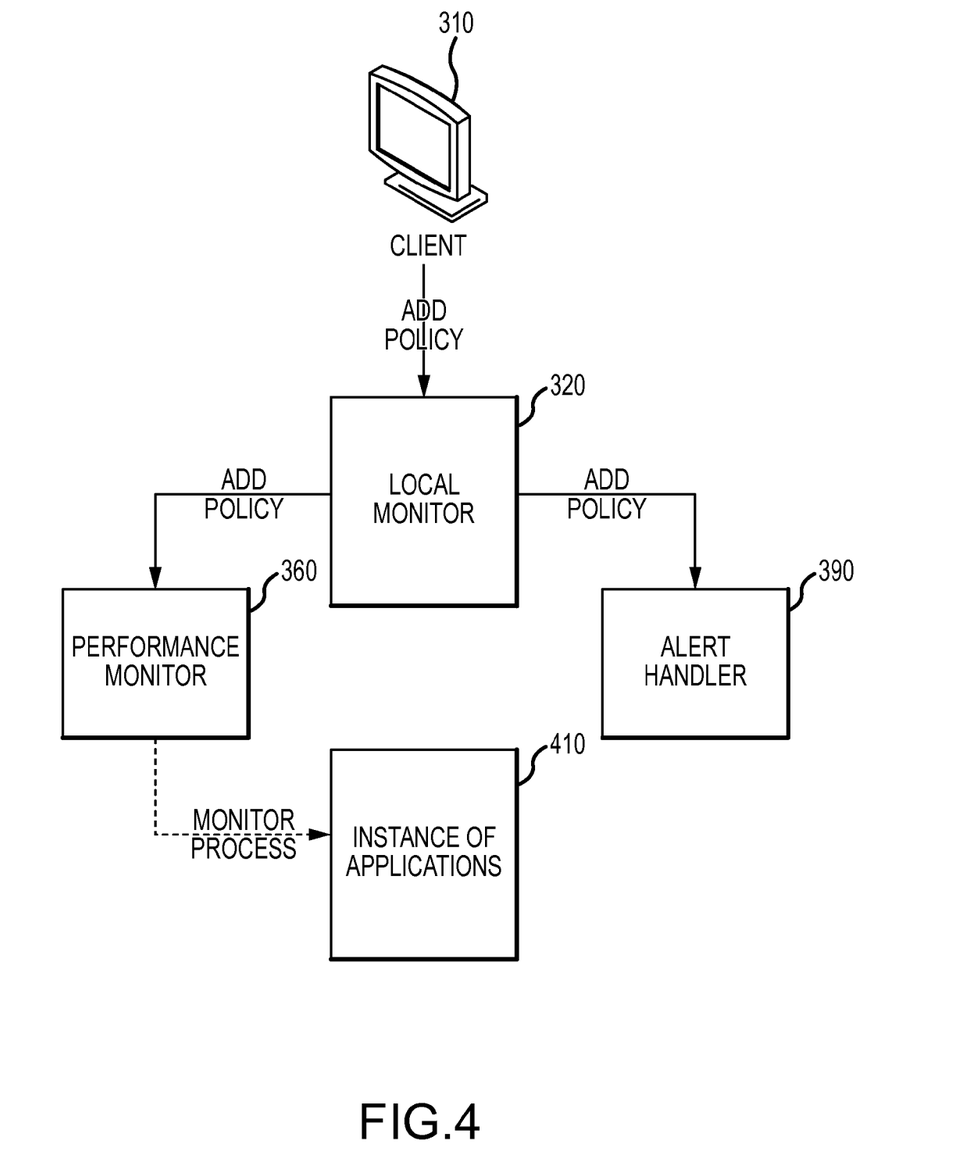
FIGS. 4 and 5 are high level block diagrams of policy data, monitor data and alert information between various engines and modules of a system for server application monitoring, load balancing, and resource allocation according to one embodiment of the present invention.
Figure 5:
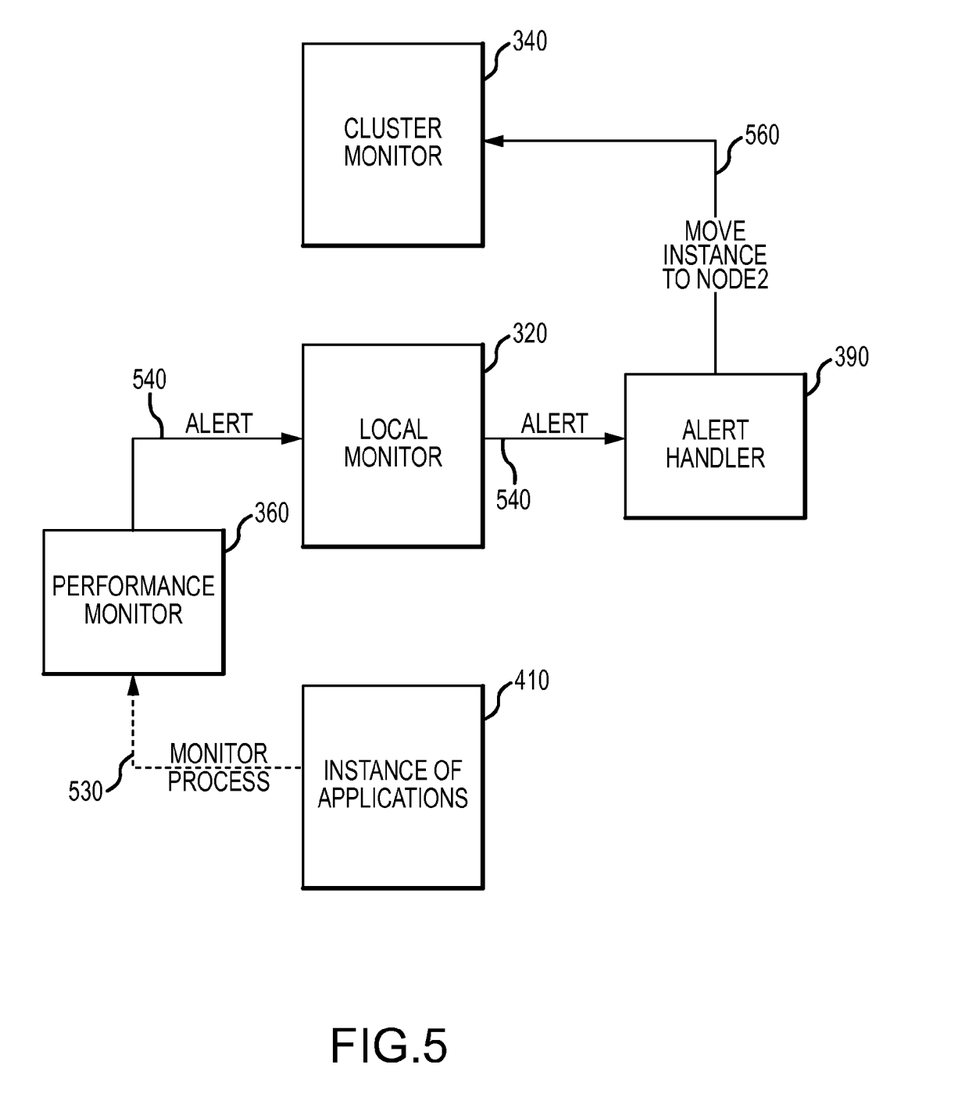

To better understand the principles and various aspects of the present invention, consider the following example referring as needed to FIGS. 4 and 5. Assume a Client 310 connects and sends a system resource monitoring policy request to the Local Monitor 320. In this case, to monitor an instance of SQL Server on a particular node within a cluster. The Local Monitor 320 registers the Client 310 with its Client Manager to keep track of the client connection, processes the request, and sends the request down to the Sync Manager to pass it onto the Performance Monitor 360. The Performance Monitor 360 logs the request with its Request Manager, Policy Manager, and Alert Manager. It then carries out the monitoring for the specified resource and, when necessary, raises an event and signals the Local Monitor 320 when a set threshold has occurred. Meanwhile, the Local Monitor 320 registers with the Alert Handler 390 to take appropriate corrective action(s) for the (a) request when necessary.

The Performance Monitor 360 analyzes the server's processor load, memory availability, disk input and output, networking activity and the like and compares that to a predetermined SLA or service level agreement. Based on one or more of these predetermined levels, the performance monitor gains information 530 from the SQL Server instance 410 that the node is about to fail or is underperforming.

An alert 540 is generated by the performance monitor 360 that is conveyed to the Local Monitor 320 and passed to the Alert Handler 390. The Alert Handler 390 either sends out a notification email, executes a custom script, and/or load-balances among the cluster members. The Alert Handler 390 pushes events as necessary to the Cluster Monitor 340 so it can notify all of the cluster members of the occurred event. In this case it pushes 560 a directive to move the instance to another node.

In this example, the SQL Server instance is compared to current server capabilities by the Performance Monitor by using predefined metrics. Upon reaching a conclusion that either the instance needs to be moved, or other resources on the node need to be freed, the present invention determines and proceeds to implement a corrective course of action.

One should note that each module of the present invention is designed to be self-contained and address a particular task. Each module can then be updated or extended at any time without having to recompile the entire tool. However, all modules must work together to support this invention.

Another aspect of the present invention is the ability to not only identify an application that is failing or is underperforming but to seek out suitable nodes on which to relocate the application. The cluster monitory maintains an understanding of available resources and node capabilities. As an application triggers an alert due to meeting an SLA, the cluster monitor uses information about that particular instance to identify which node within the cluster would be a relocation target. In the past predetermined protocols arbitrarily directed to which nodes the failover would be directed. Often the moving of the instance would then trigger another failover, and so on and so on, until a suitable node was found. As one of reasonable skill in the relevant art can appreciate, such a repetitive and undirected process is inefficient.

The present invention identifies suitable relocation nodes prior to and/or during failover occurring so that each failover is effective in its implementation. Moreover, the cluster and performance monitor, working in conjunction, can identify that a current node may be able to maintain a particular instance if another task or operation is either terminated, delayed or moved. In such an example, resources which may otherwise trigger an alert are reallocated and thus preventing a needless failover.

Figure 6:
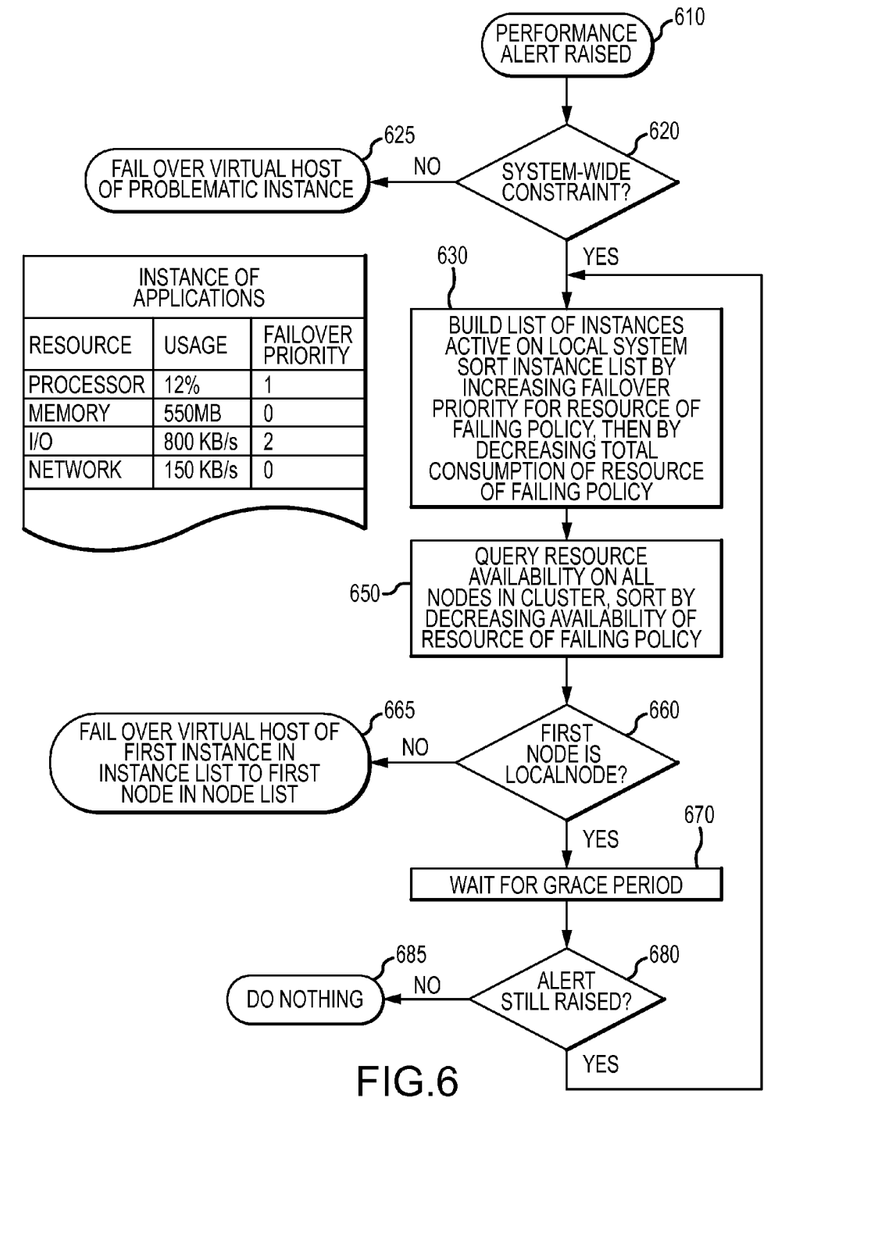
FIG. 6 shows a high level flowchart for a methodology to resolve alerts raised by the monitoring system of the present invention.

FIG. 6 is a high level flowchart for a method embodiment for alerts raised from utilization monitoring of an application instance according to the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The method shown in FIG. 6 begins the assumption that an alert has been raised 610. The first inquiry is determining 620 whether the generated alert is due to a system-wide or local constraint. When the alert is local in nature 625, a virtual host failover is initiated to resolve the condition. When the raised alert is characteristically system-wide, a list of active instances of applications on the local system is built 630. The list is sorted by increasing failover priority for resources of the failing policy. Then the list is sorted by decreasing total consumption of resources of the failing policy.

A query is then made concerning the resource availability of all nodes (physical servers and virtual servers) in the cluster 650. The response is again sorted by decreasing availability of the resource associated with the failing policy thus placing the node with the most available resource of the failing policy at the top of the list of nodes. An additional query is initiated to determine whether the first node in the list nodes is a local node 660. When this first node is not a local node, a failover of the virtual host (an instance container) of the first instance of an application in the instance (application) list to the first node in the node list is accomplished 665. When the first node is a local node 670, a grace period is allowed to pass before any future action is taken.

At the completion of a grace period, a query is again issued 680 as to whether the alert still exists. If the response to the query is no, the method ends 685. When the response is in the affirmative, a new list of active application instances is generated beginning the process anew.

The present invention confirms a nodes availability and capability prior to beginning a failover process. When a failover has been initiated, and according to one embodiment of the present invention, a predetermined node allocation and failover list or policy is accessed. This list provides direction by which nodes should be approached to receive a particular application if a node/application fails. Prior to relocation of an application instance by an instance container beginning, however, the present invention analyzes the processing, memory and other resource requirements of the failing application and compares those value to resources and capabilities of the designated failover node. If the targeted node is incapable of meeting the SLA, the node is rejected. When the failover node list has other nodes on which to failover an application, they too are examined against the application SLA until a suitable node is identified. Thus, the instantiation of the application and the instance container is not relocated to a node unless it is confirmed that the node possesses the resources and capability to meet system requirements. If the failover list is exhausted, then the application remains on the underperforming node placing a priority on the availability of the application over optimal performance.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for instance level server application monitoring, load balancing, and resource allocation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the application and appended claims.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well-known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory, to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk or a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as a data repository.

While there have been described above the principles of the present invention in conjunction with a process of instance level server application monitoring, load balancing, and resource allocation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed, either explicitly or implicitly, or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A system for application instantiation failover optimization, comprising:
    a plurality of servers configured into a server cluster, wherein the plurality of servers is comprised of a combination of one or more physical machines and one or more virtual machines, and wherein each server within the server cluster includes a local monitor engine, a cluster monitor engine, a performance monitor engine, and an alert handler engine;
    at least one instantiation of an application configured to operate on an instance container on at least one of the plurality of servers and wherein the instance container is a virtual host that operates on top of, and move freely between, the one or more virtual machines and the one or more physical servers of the server cluster and wherein the instance container instantiates at least one virtual internet protocol address distinct from an internet protocol address of the virtual machines on which it operates;
    a service level agreement associated with the at least one instantiation of the application identifying minimum application performance requirements for the instantiation of the application; and
    a failover policy identifying by the cluster monitor engine one or more servers within the server cluster operable to accept the virtual host and instantiation of the application and meet the service level agreement and wherein responsive to the instantiation of the application failing to meet the service level agreement, failing over the virtual host and instantiation of the application to one of the identified one or more servers within the server cluster.

2. The system for application instantiation failover optimization according to claim 1, wherein the service level agreement includes server processing characteristics, memory allocation, and network activity.

3. The system for application instantiation failover optimization according to claim 1, wherein the one or more servers identified in the failover policy are examined to determine whether upon instantiation of the application, they can meet the service level agreement.

4. The system for application instantiation failover optimization according to claim 3, wherein the one or more servers identified in the failover policy are sequentially examined.

5. The system for application instantiation failover optimization according to claim 3, wherein responsive to determining at least one of the servers identified in the failover policy can meet the service level agreement upon instantiation of the application, initiating the failover of the instantiation of the application.

6. The system for application instantiation failover optimization according to claim 3, wherein responsive to determining that none of the servers identified in the failover policy can meet the service level agreement upon instantiation of the application, maintaining the instantiation of the application on the at least one of the plurality of servers.

7. The system for application instantiation failover optimization according to claim 1, wherein responsive to determining that the instantiation of the application is failing to meet the service level agreement identifying by the local monitoring engine other server resources that can be modified to enable service level agreement compliance.

8. A method for application instance failover optimization, comprising:
monitoring, in a server cluster wherein the server cluster is comprised of a combination of one or more physical machines and one or more virtual machines, application instance performance of an application instance operating on an instance container on a first node within the server cluster wherein the application instance and the instance container can operate on top of, and move freely between, the one or more virtual machines and the one or more physical servers of the server cluster, and wherein the instance container instantiates at least one virtual internet protocol address distinct from an internet protocol address of the one or more virtual machines on which it operates; and
responsive to identifying application instance performance degradation on the first node within the server cluster, determining application instance resource availability within other nodes within the server cluster, and, when with resource availability confirmed, initiating failover of the instance container and application instance.

9. The method for application instance failover optimization according to claim 8, wherein application instance performance is measured against a predetermined service level agreement.

10. The method for application instance failover optimization according to claim 9, wherein application instance resource availability is based on the predetermined service level agreement.

11. The method for application instance failover optimization according to claim 8, further comprising managing by a cluster monitor server application tasking within the server cluster.

12. The method for application instance failover optimization according to claim 8, wherein responsive to confirming resource availability on a second node within the server cluster capable of supporting the application instance, initiating failover to the second node.

13. The method for application instance failover optimization according to claim 8, wherein other nodes within the server cluster are identified by a predetermined failover policy.

14. The method for application instance failover optimization according to claim 8, wherein responsive to being unable to identify another node with instance resource available, maintaining the application instance performance degradation on the first node.

15. The method for application instance failover optimization according to claim 8, further comprising identifying resource availability on the first node based on an instance failover policy.

16. The method for application instance failover optimization according to claim 15, further comprising reallocating resources on the first node based on the instance failover policy.

17. A system for application instance failover resource determination, comprising:
a plurality of servers forming a server cluster wherein the plurality of servers is comprised of a combination of one or more physical machines and one or more virtual machines, and wherein at least one server within the server cluster includes an application instance operating on top of a virtual host wherein the virtual host can operate on top of, and move freely between the one or more virtual machines and the one or more physical servers of the server cluster, and wherein the instance container instantiates at least one virtual internet protocol address distinct from an internet protocol address of the virtual machines on which it operates;
a performance monitor engine operable on each of the plurality of servers to monitor application instance performance based on a service level agreement; and
a cluster monitor engine operable to identify other servers within the server cluster having sufficient resources available to meet application instance performance requirements in compliance with the service level agreement, and wherein upon identifying degraded application instance performance, initiating a failover of the virtual host and application instance to at least one of the other servers in the server cluster sufficient to meet application instance performance in compliance with the service level agreement.

18. The system for application instance failover resource determination according to claim 17, further comprising a local monitor engine operable to determine on the server within the server cluster local instance resource allocation and failover priority.

19. The system for application instance failover resource determination according to claim 18, wherein responsive to identifying degraded instance performance reallocating server resources based an application failover priority policy.

20. The system for application instance failover resource determination according to claim 17, wherein upon failing to identify other servers having sufficient resources available to meet application performance requirements in compliance with the service level agreement, maintain degraded application instance performance.

* * * * *